United States Patent [19]

Abe et al.

[11] Patent Number: 4,839,241

[45] Date of Patent: Jun. 13, 1989

[54] COMPOSITE ZINC-SILICA ELECTRO-GALVANIZED STEEL SHEET EXCELLENT IN CORROSION RESISTANCE

[75] Inventors: Masaki Abe; Yukimitsu Shiohara; Takeshi Adaniya; Hiroshi Naemura, all of Tokyo, Japan

[73] Assignee: Nippon Kokan Kabushiki Kaisha, Tokyo, Japan

[21] Appl. No.: 183,779

[22] Filed: Apr. 20, 1988

[30] Foreign Application Priority Data

May 11, 1987 [JP] Japan .................. 62-112626

[51] Int. Cl.⁴ .............................. B32B 15/18
[52] U.S. Cl. ................... 428/659; 204/44.2; 204/55.1; 428/935
[58] Field of Search .......... 428/659, 682, 935; 204/44.2, 55.1

[56] References Cited

U.S. PATENT DOCUMENTS 4,650,724  3/1987  Umino et al. ............... 428/659

FOREIGN PATENT DOCUMENTS

| 174019 | 3/1986 | European Pat. Off. ............ 428/659 |
| 54-146228 | 11/1979 | Japan . |
| 75584 | 4/1985 | Japan .................. 428/659 |
| 60-141898 | 7/1985 | Japan . |
| 60-38480 | 8/1985 | Japan . |
| 61-143597 | 7/1986 | Japan . |

Primary Examiner—L. Dewayne Rutledge
Assistant Examiner—Robert L. McDowell
Attorney, Agent, or Firm—Frishauf, Holtz, Goodman & Woodward

[57] ABSTRACT

A composite zinc-silica electro-galvanized steel sheet excellent in corrosion resistance, having on at least one surface thereof a zinciferous plating layer, preferably in an amount of from 5 to 100 g/m² per side thereof, into which silica particles are dispersed. The above-mentioned plating layer consists essentially of:

silica particles: from 0.1 to 20 wt. %,
nitrogen compounds: from 0.0005 to 0.5 wt. % as converted into nitrogen, and the balance being zinc and incidental impurities.

The above-mentioned plating layer further additionally contains as required at least one element selected from the group consisting of:

iron: from 2 to 80 wt. %,
nickel: from 2 to 25 wt. %,
cobalt: from 0.1 to 5 wt. %, and
chromium: from 0.5 to 20 wt. %.

The total amount of the above-mentioned at least one element thus additionally contained is limited to up to 80 wt. %.

7 Claims, 1 Drawing Sheet

COMPOSITE ZINC-SILICA ELECTRO-GALVANIZED STEEL SHEET EXCELLENT IN CORROSION RESISTANCE

REFERENCE TO PATENTS, APPLICATIONS AND PUBLICATIONS PERTINENT TO THE INVENTION

So far as we know, there are available the following prior art documents pertinent to the present invention:

(1) Japanese Patent Provisional Publication No.54-146,228 dated Nov. 15, 1979;

(2) Japanese Patent Provisional Publication No.61-143,597 dated July 1, 1986;

(3) Japanese Patent Provisional Publication No.60-141,898 dated July 26, 1985; and (4) Japanese Patent Publication No.60-38,480 dated Aug. 31, 1985.

The contents of the prior arts disclosed in the aforementioned prior art documents will be discussed hereafter under the heading of the "BACKGROUND OF THE INVENTION".

FIELD OF THE INVENTION

The present invention relates to a composite zinc-silica electro-galvanized steel sheet excellent in corrosion resistance, having on at least one surface thereof a zinciferous plating layer into which silica particles are uniformly dispersed.

BACKGROUND OF THE INVENTION

With a view to further improving corrosion resistance of a zinciferous electro-galvanized steel sheet, trials are actively made to improve corrosion resistance of its zinciferous plating layer comprising zinc or a zinc alloy by uniformly dispersing oxide particles such as silica particles into the plating layer.

Japanese Patent Provisional Publication No.54-146,228 dated Nov. 15, 1979 discloses a composite zinc-silica electro-galvanized steel sheet having on at least one surface thereof a zinciferous plating layer into which silica particles are uniformly dispersed in an amount of from 2 to 15 wt. % (hereinafter referred to as "Prior Art 1").

The above-mentioned Prior Art 1 describes that the composite zinc-silica electro-galvanized steel sheet exhibits a corrosion resistance about 1.5 to 3 times as high as that of a conventional electro-galvanized steel sheet in a salt spray test.

Japanese Patent Provisional Publication No.61-143,597 dated July 1, 1986 discloses a composite zinc-silica electro-galvanized steel sheet having on at least one surface thereof a zinciferous plating layer, into which silica particles are uniformly dispersed in an amount of from 0.1 to 1.8 wt. % (hereinafter referred to as "Prior Art 2").

The above-mentioned Prior Art 2 describes that the composite zinc-silica electro-galvanized steel sheet shows a corrosion resistance about 4 to 8 times as high as that of a conventional electro-galvanized steel sheet in a salt spray test, and furthermore, the composite zinc-silica electro-galvanized steel sheet exhibits, if the surface of the plating layer thereof is treated by means of a silane coupling agent, a corrosion resistance more than about 20 times as high as that of the conventional electro-galvanized steel sheet.

Japanese Patent Provisional Publication No.60-141,898 dated July 26, 1985 discloses a composite zinc-oxide electro-galvanized steel sheet having on at least one surface thereof a zinc-alloy plating layer comprising zinc-nickel, zinc-iron or zinc-cobalt, into which particles of at least a kind of oxide such as silica are uniformly dispersed (hereinafter referred to as "Prior Art 3").

The above-mentioned Prior Art 3 describes that the composite zinc-oxide electro-galvanized steel sheet having a zinc-alloy plating layer comprising Zn-10wt. % Ni-10 wt. % $SiO_2$ from among the above-mentioned zinc-alloy plating layers, has the highest corrosion resistance that is about twice as high as that of a conventional zinc-alloy electro-galvanized steel sheet having a zinc-alloy plating layer comprising Zn-13 wt. % Ni in a salt spray test.

As disclosed in the above-mentioned Prior Arts 1 to 3, it is possible to improve corrosion resistance of a zinciferous plating layer comprising zinc or a zinc alloy by uniformly dispersing silica particles therein, so as to further improve corrosion resistance of the zinciferous electro-galvanized steel sheet.

However, as described in Prior Arts 1 to 3, it is not easy to uniformly disperse silica particles into a zinciferous plating layer, because, like particles of the other oxides, silica particles are negatively charged in an electro-galvanizing bath and have a tendency of hardly precipitating onto the surface of a steel sheet serving as the cathode. For this reason, as described in Prior Art 1, dispersion of silica particles in a slight amount of only several wt. percent into a plating layer requires use of an electro-galvanizing bath containing silica particles at a high concentration of from 50 to 200 g/l. However, a high concentration of silica particles in the electro-galvanizing bath deteriorates stability of the electro-galvanizing bath, causes cohesion or precipitation of silica particles, and reduces the service life of the electro-galvanizing bath. In addition, electric resistance of the electro-galvanizing bath becomes unnecessarily higher during the electro-galvanizing, resulting in a poorer current efficiency of electro-galvanizing and an increased consumption of electric power for electro-galvanizing.

Japanese Patent Publication No.60-38,480 dated Aug. 31, 1985 discloses the use of silica particles subjected to a cation treatment for the purpose of facilitating dispersion of silica particles into a zinciferous plating layer (hereinafter referred to as "Prior Art 4").

It is true that the use of silica particles subjected to a cation treatment facilitates dispersion thereof into a zinciferous plating layer and increases the amount of silica particles in the plating layer. This is however is only due to the fact that the cation treatment helps silica particles migrate toward the plating layer on the surface of the steel sheet serving as the cathode in the electro-galvanizing bath, and hence, more silica particles are present near the plating layer. Therefore, there is no qualitative improvement in the dispersion of silica particles into the plating layer. More particularly, the distribution of silica particles throughout the plating layer is non-uniform, and this leads to an unstable corrosion resistance of the plating layer and a performance as desired cannot be achieved. In order to ensure achievement of a desired corrosion resistance of the plating layer, therefore, it is necessary to add more silica particles into the electro-galvanizing bath in an amount sufficient to make up for this possible loss in quality. This often results in a decreased service life of the electro-galvanizing bath due to the increase in concentration of silica particles, and an increased consumption of electric power due to the increased electric resistance of the electro-galvanizing bath.

The amount of the zinciferous plating layer, into which silica particles are dispersed, on at least one surface of the steel sheet, which is not specified in the above-mentioned Prior Arts 1 to 4, is usually within the range of from 5 to 100 g/m$^2$ per side of the steel sheet.

Under such circumstances, there is a demand for the development of a composite zinc-silica electro-galvanized steel sheet excellent in corrosion resistance, having on at least one surface thereof a zinciferous plating layer with a high and stable corrosion resistance, into which silica particles are uniformly dispersed, but a composite zinc-silica electro-galvanized steel sheet provided with such a property has not as yet been proposed.

SUMMARY OF THE INVENTION

An object of the present invention is therefore to provide a composite zinc-silica electro-galvanized steel sheet excellent in corrosion resistance, having on at least one surface thereof a zinciferous plating layer with a high and stable corrosion resistance, into which silica particles are uniformly dispersed.

In accordance with one of the features of the present invention, in a composite zinc-silica electro-galvanized steel sheet excellent in corrosion resistance, having on at least one surface thereof a zinciferous plating layer in a prescribed amount, into which silica particles are uniformly dispersed; there is provided the improvement wherein:

said plating layer consists essentially of:
  silica particles : from 0.1 to 20 wt. %,
  nitrogen compounds : from 0.0005 to 0.5 wt. % as converted into nitrogen,
and the balance being zinc and incidental impurities.

Said plating layer further additionally contains as required at least one element selected from the group consisting of:
  iron: from 2 to 80 wt. %,
  nickel: from 2 to 25 wt. %,
  cobalt: from 0.1 to 5 wt. %, and
  chromium: from 0.5 to 20 wt. %.

The total amount of said at least one element thus additionally contained is limited to up to 80 wt. %.

DETAILED DESCRIPTION OF PREFERRED EMBODIMENTS

Figure 1:
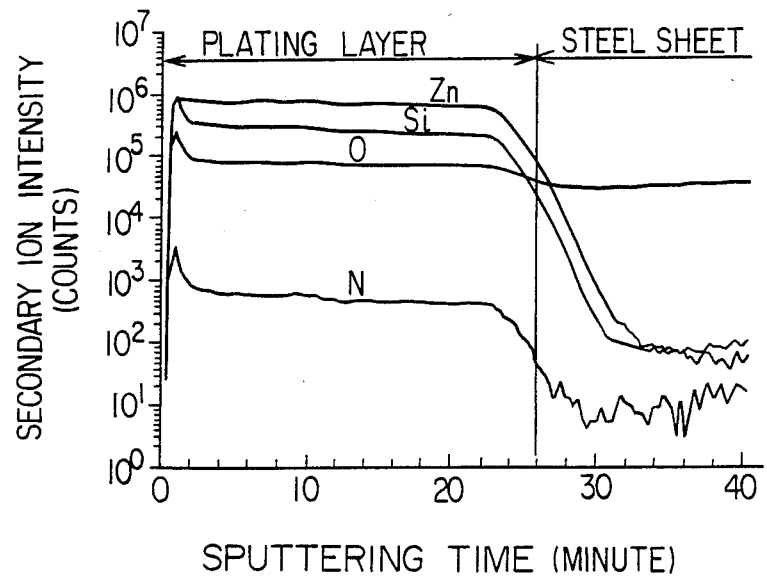
FIG. 1 is a graph illustrating the result of analysis by means of a known ion micro analyzer of the amounts of zinc, silicon, oxygen and nitrogen in the zinciferous plating layer, into which silica particles are uniformly dispersed, of the composite zinc-silica electro-galvanized steel sheet of the present invention.

From the above-mentioned point of view, extensive studies were carried out in order to develop a composite zinc-silica electro-galvanized steel sheet excellent in corrosion resistance, having on at least one surface thereof a zinciferous plating layer with a high and stable corrosion resistance, into which silica particles are uniformly dispersed. As a result, the following finding was obtained: Dispersion of nitrogen compounds in a slight amount together with silica particles into a zinciferous plating layer stabilizes and largely improves corrosion resistance of the plating layer.

The present invention was made on the basis of the aforementioned finding. Now, the composite zinc-silica electro-galvanized steel sheet excellent in corrosion resistance of the present invention is described below.

In the present invention, nitrogen compounds are uniformly dispersed in a slight amount into the zinciferous plating layer, into which silica particles are uniformly dispersed, on at least one surface of the steel sheet. These nitrogen compounds are dispersed into the zinciferous plating layer by using a zinciferous electro-galvanizing bath containing silica particles and at least one of nitric acid, nitrous acid and salts thereof. The nitrogen compounds are present in the plating layer in the form of nitrogen oxides such as nitric acid or nitrous acid, or nitrogen-containing reduction products of these nitrogen oxides.

The reasons why corrosion resistance of the zinciferous plating layer is stabilized and largely improved by the dispersion of nitrogen compounds in a slight amount together with silica particles into the plating layer are not fully known, but conjectured as follows:

(1) For the purpose of dispersing nitrogen compounds together with silica particles into the zinciferous plating layer, at least one of nitric acid, nitrous acid and salts thereof is added, as described above, to an electro-galvanizing bath containing silica particles. Nitric acid ions or nitrous acid ions from thus added nitric acid or nitrous acid act on the surface of the zinciferous plating layer precipitated onto the surface of the steel sheet during electro-galvanizing, and maybe oxidizing action of these ions incessantly activates the entire surface of the plating layer so as to permit easy adsorption of silica particles in the electro-galvanizing bath. Because of this action, silica particles in the electro-galvanizing bath are adsorbed and precipitated onto the surface of the plating layer while lumps of silica particles are divided into smaller pieces. Silica particles having thus precipitated onto the surface of the plating layer are embedded by plating metal having newly been precipitated onto the plating layer. Therefore, in the zinciferous plating layer, into which silica particles are dispersed, formed by the repetition of precipitation of silica particles and embedding of silica particles by the plating metal, precipitation and distribution of silica particles are uniform. This eliminates the instability of corrosion resistance of the plating layer caused by ununiform dispersion of silica particles.

(2) In the zinciferous plating layer into which silica particles are uniformly dispersed, nitrogen compounds in the form of nitrogen oxides which are produced by nitric acid ions or nitrous acid ions or nitrogen-containing reduction products of these nitrogen oxides are precipitated and dispersed along with the above-mentioned precipitation of silica particles.

These nitrogen compounds dispersed into the plating layer fill gaps between plating metal grains and silica particles in the plating layer, thus resulting in a denser plating layer. As a result, disagreement between plating metal grains and silica particles, which are largely different in size from each other, and the stress occurring in the plating layer resulting from this disagreement are alleviated, and corrosion resistance of the plating layer is improved. In addition, nitrogen compounds firmly connect silica particles to plating metal grains in the plating layer under the effect of their strong affinity, thus firmly fixing silica particles in the plating layer. Even in a corrosive environment, therefore, the plating layer forms a chemically stable film of corrosion product on the surface thereof, and this serves as an excellent barrier against subsequent corrosion, so that corrosion resistance of the plating layer is further improved.

If the amount of nitrogen compounds dispersed into the zinciferous plating layer into which silica particles are dispersed is under 0.0005 wt. % as converted into nitrogen, a high and stable corrosion resistance of the plating layer cannot be obtained. Furthermore, because of segregation of silica particles in the plating layer, it is impossible to form the plating layer having a smooth surface on the surface of the steel sheet, thus presenting a rough exterior appearance. If the amount of nitrogen compounds in the plating layer is over 0.5 wt. % as converted into nitrogen, on the other hand, the plating layer becomes brittle and has a lower workability. The amount of nitrogen compounds in the plating layer should therefore be within the range of from 0.0005 to 0.5 wt. %, and more preferably, within the range of from 0.003 to 0.1 wt. %, is converted into nitrogen.

In the present invention, a particle size of silica particles dispersed into the zinciferous plating layer should preferably be limited to up to 100 nm. With a particle size of over 100 nm, it becomes difficult to uniformly disperse silica particles into the plating layer and a stable corrosion resistance of the plating layer cannot be obtained. For the easiness of handling in the addition to the electro-galvanizing bath, it is desirable to use colloidal silica as silica particles. The amount of silica particles in the plating layer should preferably be within the range of from 0.1 to 20 wt. %. If the amount of silica particles in the plating layer is under 0.1 wt. %, it is impossible to obtain a high corrosion resistance of the plating layer. If the amount of silica particles is over 20 wt. %, on the other hand, there occurs deterioration of workability of the plating layer.

In the present invention, the plating layer into which silica particles are uniformly dispersed may contain at least one element of iron, nickel, cobalt and chromium, as required, further additionally to zinc alone as the metal component. Iron, if contained in the plating layer in addition to zinc, has the effect of improving paintability and corrosion resistance after painting of the plating layer. With an iron content of under 2 wt. % in the plating layer, the above-mentioned effect is insufficient. With an iron content of over 80 wt. %, on the other hand, workability of the plating layer decreases, and the plating layer has a lower corrosion resistance. When the plating layer is to contain iron in addition to zinc, therefore, the iron content should be within the range of from 2 to 80 wt. %. Nickel, if contained in the plating layer in addition to zinc, has the effect of further improving corrosion resistance of the plating layer. With a nickel content in the plating layer of under 2 wt. %, the above-mentioned effect is insufficient. With a nickel content of over 35 wt. %, on the other hand, workability of the plating layer decreases, and the increased consumption of expensive nickel would be a demerit in economics. When the plating layer is to contain nickel in addition to zinc, therefore, the nickel content should be within the range of from 2 to 35 wt. %. Cobalt, if contained in the plating layer in addition to zinc, has the effect of further improving corrosion resistance of the plating layer. With a cobalt content in the plating layer of under 0.1 wt. %, the above-mentioned effect is insufficient. With a cobalt content of over 5 wt. %, on the other hand, the plating layer has a lower corrosion resistance. When the plating layer is to contain cobalt in addition to zinc, therefore, the cobalt content should be within the range of from 0.1 to 5 wt. %. Chromium, if contained in the plating layer in addition to zinc, has the effect of improving corrosion resistance of the plating layer. With a chromium content in the plating layer of under 0.5 wt. %, the above-mentioned effect is insufficient. With a chromium content of over 20 wt. %, on the other hand, adhesion of the plating layer to the surface of the steel sheet decreases. When the plating layer is to contain chromium in addition to zinc, therefore, the chromium content should be within the range of from 0.5 to 20 wt. %. When at least two elements of iron, nickel, cobalt and chromium are contained in the plating layer in addition to zinc, the individual contents of these elements should be within the respective ranges as mentioned above, and the total content thereof should be limited to up to 80 wt. %. With a total content of these elements in the plating layer of over 80 wt. %, both workability and corrosion resistance of the plating layer decrease.

In the present invention, the amount of the zinciferous plating layer, into which silica particles are uniformly dispersed, on the surface of the steel sheet should preferably be within the conventional range of from 5 to 100 g/m$^2$ per side of the steel sheet. With an amount of the plating layer of under 5 g/m$^2$, improvement of corrosion resistance of the plating layer is insufficient. With an amount of the plating layer of over 100 g/m$^2$, on the other hand, workability of the plating layer decreases and electro-galvanizing becomes uneconomical. However, the amount of plating layer is not always limited to the range of from 5 to 100 g/m$^2$.

In the present invention, the steel sheet onto which the zinciferous plating layer containing uniformly dispersed silica particles is to be formed may be a steel sheet not subjected to a surface treatment such as a cold-rolled steel sheet or a hot-rolled steel sheet or may be a conventional zinc plated steel sheet or a conventional zinc alloy plated steel sheet having a plating layer containing, in addition to zinc, at least one element of iron, nickel, cobalt and chromium. When using a conventional zinc plated steel sheet or a conventional zinc alloy plated steel sheet, not specifically prescribed, the amount of the plating layer should preferably be within the range of from 10 to 60 g/m$^2$ per side considering reasonable manufacturing cost and workability of the plating layer. Furthermore, when using a conventional zinc alloy plating steel sheet, the content of at least one element of iron, nickel, cobalt and chromium contained in the plating layer in addition to zinc is not specifically prescribed. However, when considering corrosion resistance and workability of the plating layer, the content of iron, if contained in the plating layer in addition to zinc, should preferably be within the range of from 2 to 35 wt. %; the content of nickel, if contained in the plating layer in addition to zinc, should preferably be within the range of from 2 to 20 wt. %; the content of cobalt, if contained in the plating layer in addition to zinc, should preferably be within the range of from 0.1 to 5 wt. %; and the content of chromium, if contained in the plating layer in addition to zinc, should preferably be within the range of from 0.5 to 20 wt. %. When at least two elements of iron, nickel, cobalt and chromium are contained in the plating layer in addition to zinc, the individual contents of these elements should preferably be within the respective ranges as mentioned above, and the total content thereof should preferably be limited to up to 35 wt. %.

FIG. 1 is a graph illustrating the typical result of analysis by means of a known ion micro analyzer of the amounts of zinc, silicon, oxygen and nitrogen in the zinciferous plating layer, into which silica particles are uniformly dispersed, of the composite zinc-silica electro-galvanized steel sheet of the present invention. In FIG. 1, the ordinate represents the secondary ion intensity (counts) of each element, produced by sputtering of the plating layer, and the abscissa, the sputtering time (minute) of the plating layer. The secondary ion intensity of each element corresponds to the amount of the element at the depth of sputtering of the plating layer.

persed was similarly formed on the surface of a steel sheet not subjected to a surface treatment through electro-galvanizing, whereby electro-galvanized steel sheets for comparison Nos. 1, 7, 8, 10, 12 and 13 were obtained.

The chemical compositions and the amounts of the zinciferous plating layers of these electro-galvanized steel sheets Nos. 1 to 16 are shown in Table 1. The hours of salt water spray before occurrence of red rust in a salt spray test (JIS Z 2371) for 1,000 consecutive hours carried out on these electro-galvanized steel sheets Nos. 1 to 16 are also shown in Table 1.

TABLE 1

|  | No. | Chemical composition of plating layer (wt. %) | | | | | | Amount of plating layer ($g/m^2$) | Corrosion resistance (hr) |
|  |  | iron | Nickel | Cobalt | Chromium | Silica | Nitrogen compounds (as converted into nitrogen) | Zinc and incidental impurities | | |
| --- | --- | --- | --- | --- | --- | --- | --- | --- | --- | --- |
|  |  | Electro-galvanized steel sheet | | | | | | | | |
| for comparison | 1 | — | — | — | — | 0.5 | trace | balance | 20 | 40 |
| of the present invention | 2 | — | — | — | — | 0.4 | 0.004 | balance | 20 | 80 |
|  | 3 | — | — | — | — | 1.0 | 0.008 | balance | 10 | 250 |
|  | 4 | — | — | — | — | 2.5 | 0.010 | balance | 80 | over 1,000 |
|  | 5 | — | — | — | — | 5.4 | 0.015 | balance | 40 | over 1,000 |
|  | 6 | — | — | — | — | 19.8 | 0.075 | balance | 40 | over 1,000 |
| for comparison | 7 | 15 | — | — | — | — | trace | balance | 40 | 40 |
|  | 8 | 13 | — | — | — | 0.4 | trace | balance | 40 | 60 |
| of the present invention | 9 | 13 | — | — | — | 2.6 | 0.011 | balance | 40 | 200 |
| for comparison | 10 | — | 13 | — | — | 3.1 | trace | balance | 40 | 700 |
| of the present invention | 11 | — | 13 | — | — | 3.0 | 0.014 | balance | 40 | over 1,000 |
| for comparison | 12 | — | — | 2 | — | — | trace | balance | 40 | 80 |
|  | 13 | — | — | 2 | — | 4.2 | trace | balance | 40 | 160 |
| of the present invention | 14 | — | — | 2 | — | 4.5 | 0.012 | balance | 40 | over 1,000 |
|  | 15 | — | — | — | 3 | 5 | 0.025 | balance | 20 | 600 |
|  | 16 | — | — | 1.5 | 3 | 5 | 0.025 | balance | 20 | over 1,000 |

The sputtering time corresponds to the depth of sputtering of the plating layer. As shown in FIG. 1, silicon (Si) and nitrogen (N) are uniformly present from the upper portion to the lower portion of the plating layer. This suggests that silica particles and nitrogen compounds are uniformly dispersed into the plating layer. Details such as the form of nitrogen compounds are not fully known, but nitrogen compounds are considered to firmly connect silica particles to zinc grains in the plating layer under the effect of their strong affinity.

EXAMPLE 1

An electro-galvanizing bath was prepared, by using a conventional sulfuric acid electro-galvanizing bath for electro-galvanizing of zinc or a zinc alloy as the basic bath, adding colloidal silica to this basic bath so as to give a silica particle concentration within the range of from 0.5 to 100 g/l, further adding sodium nitrate so as to give a content of nitric acid ion within the range of from 100 to 10,000 ppm, and adjusting pH to the range of from 1 to 6. Using the thus prepared electro-galvanizing bath, with a zinc plate as the anode and a steel sheet not subjected to a surface treatment as the cathode, a zinciferous plating layer into which silica particles were uniformly dispersed was formed on the surface of the above-mentioned steel sheet through electro-galvanizing, whereby electro-galvanized steel sheets of the present invention Nos. 2, 3, 4, 5, 6, 9, 11, 14, 15 and 16 were obtained.

For comparison purposes, using the above-mentioned basic bath without modification or the basic bath added only with colloidal silica, a zinciferous plating layer into which silica particles were not dispersed or a zinciferous plating layer into which silica particles were dis- As shown in Table 1, each of the electro-galvanized steel sheet for comparison No. 1, and the electro-galvanized steel sheets of the present invention Nos. 2, 3, 4, 5 and 6 has a zinciferous plating layer into which silica particles are dispersed. However, the electro-galvanized steel sheet for comparison No. 1, of which the plating layer does not contain dispersed nitrogen compounds, shows a low corrosion resistance and red rust is produced on this sheet in a salt water spray for 40 hours. The electro-galvanized steel sheets of the present invention Nos. 2, 3, 4, 5 and 6, each having the plating layer containing uniformly dispersed nitrogen compounds, have a high corrosion resistance. Even in the electro-galvanized steel sheet of the present invention No.2 having an amount of silica particles in the plating layer as small as that of the electro-galvanized steel sheet for comparison No. 1, hence showing a lower corrosion resistance, 80 hours of salt water spray are required before occurrence of red rust.

As shown in Table 1, the electro-galvanized steel sheet for comparison No. 7 has a zinc-iron alloy plating layer into which silica particles are not dispersed, and each of the electro-galvanized steel sheet for comparison No. 8 and the electro-galvanized steel sheet of the present invention No. 9 has a zinc-iron alloy plating layer into which silica particles are dispersed. Because of the presence of silica particles dispersed into the plating layer, the electro-galvanized steel sheet for comparison No. 8 has a corrosion resistance higher than that of the electro-galvanized steel sheet for comparison No. 7, and requires 60 hours of salt water spray before occurrence of red rust. However, the electro-galvanized steel sheet of the present invention No. 9 has a high corrosion resistance because of the presence of nitrogen compounds further additionally dispersed into the plating layer, even taking into account the high content of silica particles in the plating layer, and requires 200 hours of salt water spray before occurrence of red rust, about three times as long as that of the electro-galvanized steel sheet for comparison No. 8.

As shown in Table 1, each of the electro-galvanized steel sheet for comparison No. 10 and the electro-galvanized steel sheet of the present invention No. 11 has a zinc-nickel alloy plating layer into which silica particles are dispersed, and has a high corrosion resistance because of the presence of nickel which improves corrosion resistance in addition to zinc in the plating layer. However, the electro-galvanized steel sheet for comparison No. 10, of which the plating layer does not contain dispersed nitrogen compounds, requires only 700 hours of salt water spray before occurrence of red rust. In contrast, the electro-galvanized steel sheet of the present invention No. 11 has the plating layer into which nitrogen compounds are uniformly dispersed, has a corrosion resistance so high as to require more than 1,000 hours of salt water spray before occurrence of red rust.

As shown in Table 1, the electro-galvanized steel sheet for comparison No. 12 has a zinc-cobalt alloy plating layer into which silica particles are not dispersed, and each of the electro-galvanized steel sheet for comparison No. 13 and the electro-galvanized steel sheet of the present invention No. 14 has a zinc-cobalt alloy plating layer into which silica particles are dispersed. The electro-galvanized steel sheet for comparison No. 13, of which the plating layer contains dispersed silica particles, has a higher corrosion resistance than that of the electro-galvanized steel sheet for comparison No. 12 and requires 160 hours of salt water spray before occurrence of red rust. However, the electro-galvanized steel sheet of the present invention No. 14, having the plating layer into which nitrogen compounds are further additionally dispersed, shows a high corrosion resistance and requires more than 1,000 hours of salt water spray before occurrence of red rust.

Also each of the electro-galvanized steel sheet of the present invention No. 15, having a zinc-chromium alloy plating layer into which silica particles are uniformly dispersed, and the electro-galvanized steel sheet of the present invention No. 16, having a zinc-cobalt-chromium alloy plating layer into which silica particles are uniformly dispersed, shows a high corrosion resistance because of the further additional dispersion of nitrogen compounds in the plating layer.

EXAMPLE 2

Using an electro-galvanizing bath prepared in a manner similar to that in EXAMPLE 1, with a zinc plate as the anode and a surface-treated steel sheet such as a conventional zinc plated steel sheet or a conventional zinc alloy plated steel sheet as the cathode, a zinciferous plating layer into which silica particles were uniformly dispersed was formed on the surface of the above-mentioned steel sheet through electro-galvanizing, whereby electro-galvanized steel sheets of the present invention Nos. 17 to 28 were obtained.

The chemical compositions and the amounts of the zinciferous plating layers of these electro-galvanized steel sheets of the present invention Nos. 17 to 28 and the kinds of the surface-treated steel sheets as used are shown in Table 2. The hours of salt water spray before occurrence of red rust in a salt spray test (JIS Z 2371) for 1,000 consecutive hours carried out on these electro-galvanized steel sheets of the present invention Nos. 17 to 28 are also shown in Table 2.

TABLE 2

| | Surface-treated steel sheet used | | Chemical composition of plating layer (wt. %) | | | | | | Amount of plating layer (g/m²) | Corrosion resistance (hr) |
|---|---|---|---|---|---|---|---|---|---|---|
| No. | Kind | Amount of plating layer (g/m²) | Iron | Nickel | Cobalt | Chromium | Silica | Nitrogen Compounds (as converted into nitrogen) | Zinc and incidental impurities | | |
| | | | Electro-galvanized steel sheet of the present invention | | | | | | | | |
| 17 | Zn plated steel sheet | 40 | — | — | — | — | 3.4 | 0.007 | Balance | 20 | 560 |
| 18 | Zn-13 wt. % Ni alloy plated steel sheet | 20 | — | — | — | — | 5.1 | 0.018 | Balance | 20 | 860 |
| 19 | Zn plated steel sheet | 40 | 14 | — | — | — | 3.5 | 0.013 | Balance | 20 | 300 |
| 20 | Zn-15 wt. % Fe alloy plated steel sheet | 40 | 15 | — | — | — | 2.6 | 0.012 | Balance | 10 | 120 |
| 21 | Zn-13 wt. % Ni alloy plated steel sheet | 20 | 12 | — | — | — | 3.2 | 0.013 | Balance | 10 | 400 |
| 22 | Zn-13 wt. % Ni alloy plated steel sheet | 25 | — | — | — | — | 15.6 | 0.064 | Balance | 15 | over 1,000 |
| 23 | Zn-13 wt. % Ni alloy plated steel sheet | 10 | — | 13 | — | — | 3.1 | 0.015 | Balance | 40 | over 1,000 |
| 24 | Zn plated steel sheet | 20 | — | 14 | — | — | 5.2 | 0.025 | Balance | 20 | 720 |
| 25 | Zn plated steel sheet | 20 | — | — | — | 3 | 5 | 0.025 | Balance | 20 | 700 |
| 26 | Zn plated steel sheet | 20 | — | — | 1.5 | — | 3.6 | 0.011 | Balance | 20 | 600 |
| 27 | Zn-15 wt. % Fe alloy plated steel sheet | 30 | — | — | 1.2 | — | 5.4 | 0.020 | Balance | 20 | 750 |
| 28 | Zn-13 wt. % Ni-2 wt. % Co alloy plated steel sheet | 20 | — | 13 | 2.0 | — | 3.2 | 0.012 | Balance | 20 | over 1,000 |

As shown in Table 2, in the electro-galvanized steel sheets of the present invention Nos. 17 to 28, each having a zinciferous plating layer, into which silica particles are dispersed, formed on the surface of a surface-treated steel sheet such a zinc plated steel sheet or a zinc alloy plated steel sheet, the amount of the plating layer according to the present invention is rather small. However, the electro-galvanized steel sheets of the present invention Nos. 17 to 28, each having the plating layer into which nitrogen compounds are further additionally dispersed, show a high corrosion resistance in all cases.

EXAMPLE 3

A peel test based on a draw-bead tester was applied to the zinciferous plating layer of each of the electro-galvanized steel sheet for comparison No. 1 and the electro-galvanized steel sheets of the present invention Nos. 2 and 5 shown in EXAMPLE 1, and a conventional zinc electro-galvanized steel sheet and a conventional hot-dip zinc plated steel sheet. In the above-mentioned test, a pressure of the male die of the draw bead tester applied onto the plating layer of the steel sheet was 500 kg, and a drawing speed of steel sheet was 200 mm/minute. After the completion of the peel test based on the draw-bead tester, another peel test based on cellophane tape was applied to the plating layer. The results of these tests are shown in Table 3.

TABLE 3

| | Amount of plating layer (g/m$^2$) | Amount of peeloff in peel test by tester (g/m$^2$) | Presence of peeloff in peel test with cellophane tape |
|---|---|---|---|
| Conventional zinc electro-galvanized steel sheet | 40 | 1.5 | None |
| Conventional hot-dip zinc plated steel sheet | 90 | 12.0 | Some |
| Electro-galvanized steel sheet for comparison No. 1 | 20 | 2.1 | Some |
| Electro-galvanized steel sheet of the present invention No. 2 | 20 | 1.0 | None |
| Electro-galvanized steel sheet of the present invention No. 5 | 40 | 1.7 | None |

As shown in Table 3, in the electro-galvanized steel sheets of the present invention Nos. 2 and 5, the amount of peeloff of the plating layer in the peel test based on the draw-bead tester is a small as in the conventional zinc electro-galvanized steel sheet, and the peeloff of the plating layer in the peel test based on cellophane tape is non-existent as in the conventional zinc electro-galvanized steel sheet. As is known from these facts, the electro-galvanized steel sheets of the present invention Nos. 2 and 5 have not only a high corrosion resistance of the plating layer, but also a satisfactory workability of the plating layer as in the conventional zinc electro-galvanized steel sheet.

According to the present invention, as described above in detail, it is possible to obtain a composite zinc-silica electro-galvanized steel sheet excellent in corrosion resistance, having on at least one surface thereof a zinciferous plating layer, with a high and stable corrosion resistance, into which silica particles are uniformly dispersed.

What is claimed is:

1. In an electro-galvanized steel sheet excellent in corrosion resistance, having on at least one surface thereof an outer zinciferous plating layer into which silica particles are uniformly dispersed; the improvement wherein:
said zinciferous plating layer consists essentially of:
silica particles: from 0.1 to 20 wt. %,
nitrogen compounds: from 0.0005 to 0.5 wt. % as converted into nitrogen, and
the balance being essentially zinc.

2. The electro-galvanized steel sheet as claimed in claim 1, wherein:
said plating layer further additionally contains one element selected from the group consisting of:

| iron | from 2 to 80 wt. %, |
|---|---|
| nickel | from 2 to 25 wt. %, |
| cobalt | from 0.1 to 5 wt. %, and |
| chromium | from 0.5 to 20 wt. %. |

3. The electro-galvanized steel sheet as claimed in claim 1, wherein:
said plating layer further additionally contains at least two elements, in an amount of up to 80 wt. % in total, selected from the group consisting of:

| iron | from 2 to 80 wt. %, |
|---|---|
| nickel | from 2 to 25 wt. %, |
| cobalt | from 0.1 to 5 wt. %, and |
| chromium | from 0.5 to 20 wt. %. |

4. The electro-galvanized steel sheet as claimed in any one of claims 1 to 3, wherein:
said said plating layer is within the range of from 5 to 100 g/m$^2$ per side of said steel sheet.

5. The electro-galvanized steel sheet as claimed in any one of claims 1 to 3, wherein:
said steel sheet is a steel sheet not subjected to a surface treatment.

6. The electro-galvanized steel sheet as claimed in any one of claims 1 to 3, wherein:
said steel sheet is selected from the group consisting of zinc and zinc alloy plated steel sheets.

7. In a method for electro-galvanizing steel sheet to produce a plating layer selected from the group consisting of zinc and zinc alloys having fine silica particles with a particle size not exceeding about 100 nm uniformly distributed therethrough which comprises employing in the zinc or zinc alloy electro-galvanizing bath containing said silica particles to be deposited, a nitrogen compound in amount equivalent to 100 to 10,000 ppm of nitric acid ion.

* * * * *